US012647662B2

(12) United States Patent　　　　(10) Patent No.:　US 12,647,662 B2
Konopisky　　　　　　　　　　　　(45) Date of Patent:　Jun. 2, 2026

(54) IMAGE CAPTURE DEVICE

(71) Applicant: VALEO COMFORT AND DRIVING ASSISTANCE, Créteil (FR)

(72) Inventor: Jan Konopisky, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 92 days.

(21) Appl. No.: 18/646,909

(22) Filed: Apr. 26, 2024

(65) Prior Publication Data

US 2024/0364986 A1　　　Oct. 31, 2024

(30) Foreign Application Priority Data

Apr. 27, 2023　(EP) ..................................... 23170457

(51) Int. Cl.
　　*H04N 23/52*　　　(2023.01)
　　*H04N 23/51*　　　(2023.01)
(52) U.S. Cl.
　　CPC ............. *H04N 23/52* (2023.01); *H04N 23/51* (2023.01)
(58) Field of Classification Search
　　CPC ........ H04N 23/52; H04N 23/51; H04N 23/56; H04N 23/54; H04N 23/55
　　See application file for complete search history.

(56) References Cited

U.S. PATENT DOCUMENTS

| | | | | |
|---|---|---|---|---|
| 6,266,197 | B1 * | 7/2001 | Glenn ................... | H10F 39/804 |
| | | | | 359/821 |
| 9,628,678 | B2 * | 4/2017 | Kim ........................ | H04N 23/51 |
| 2005/0081377 | A1 * | 4/2005 | Brandenburg ....... | H05K 9/0045 |
| | | | | 438/109 |
| 2009/0015706 | A1 * | 1/2009 | Singh ..................... | G03B 17/00 |
| | | | | 348/340 |
| 2009/0195897 | A1 * | 8/2009 | Tsai ........................ | H04N 23/55 |
| | | | | 359/819 |
| 2010/0304065 | A1 * | 12/2010 | Tomantschger .... | C23C 16/0227 |
| | | | | 427/322 |
| 2016/0006913 | A1 * | 1/2016 | Kettunen .............. | H10F 39/024 |
| | | | | 348/374 |
| 2017/0272624 | A1 * | 9/2017 | Minikey, Jr. ........... | B60R 11/04 |
| 2018/0295262 | A1 * | 10/2018 | Dellock ................. | G03B 17/02 |
| 2021/0099618 | A1 * | 4/2021 | O ............................. | H05K 1/18 |
| 2022/0066036 | A1 * | 3/2022 | Shi .......................... | H01S 5/183 |

FOREIGN PATENT DOCUMENTS

| | | | | | |
|---|---|---|---|---|---|
| CN | 112888282 | A | * | 6/2021 | ............. H04N 23/52 |
| CN | 115087921 | A | * | 9/2022 | ............. G03B 30/00 |
| DE | 102020211194 | A1 | * | 3/2022 | ............. H04N 23/57 |

* cited by examiner

*Primary Examiner* — Timothy J Henn
(74) *Attorney, Agent, or Firm* — Osha Bergman Watanabe & Burton LLP

(57)　　　　　　ABSTRACT
An image capture device including a housing enclosing an electronic circuit board including an image sensor attached to the face thereof is disclosed. The housing includes a front portion facing the first face and a rear portion facing a second face opposite the first face. The front portion includes a front electromagnetic shield including an aperture facing the image sensor and an infrared transparent material overmoulded onto the front electromagnetic shield and mechanically obstructing the aperture.

10 Claims, 2 Drawing Sheets

IMAGE CAPTURE DEVICE

TECHNICAL FIELD OF THE INVENTION

Figure 1:
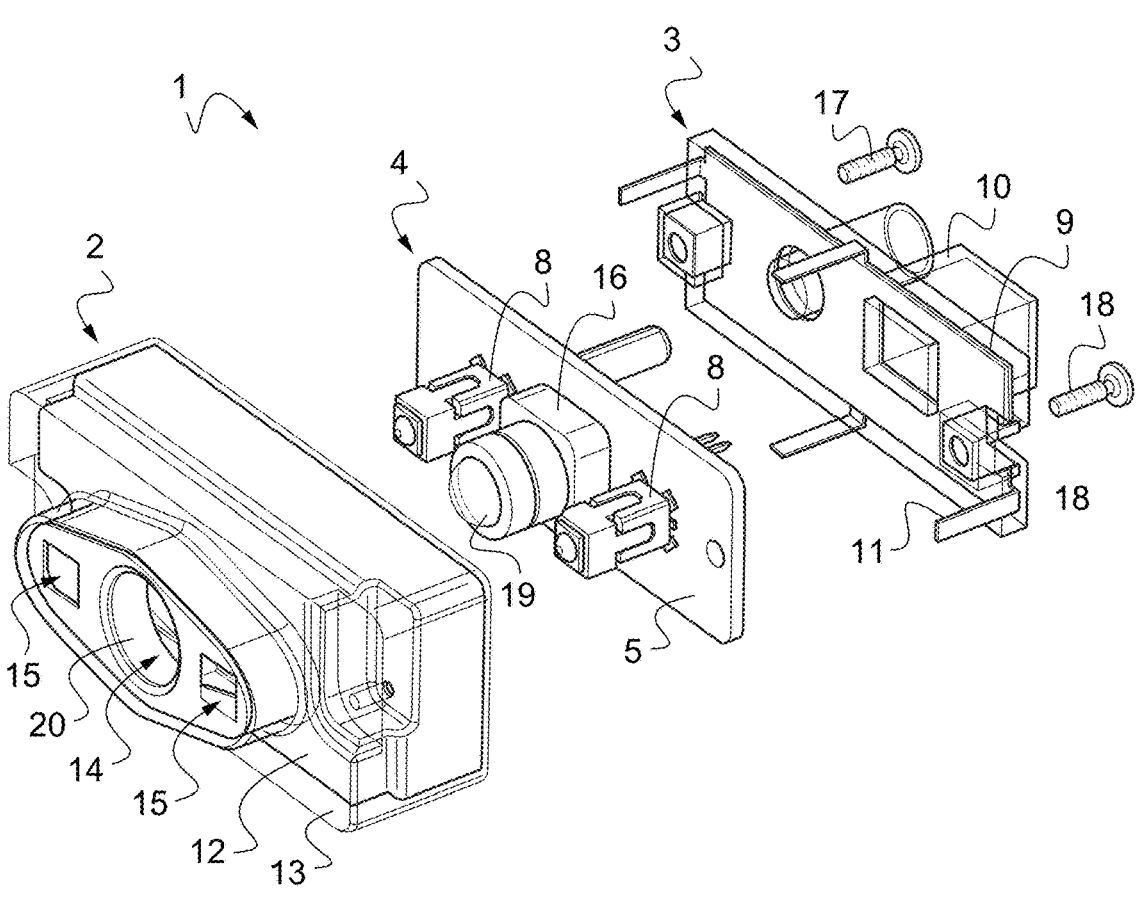

The invention relates to the field of electronic devices, and in particular to the field of housing for electronic device.

More precisely the invention relates to an image capture device.

BACKGROUND INFORMATION AND PRIOR ART

In order to integrate electronic devices in larger systems, it is known to protect or hide them with a housing. For instance, some automotive vehicles are equipped with one or several image capture apparatuses configured to perform driver monitoring. Such devices typically comprise an integrated circuit board protected by an electromagnetic shield and by a polymeric transparent casing. The electromagnetic shield ensures the electromagnetic compatibility of the device a gives it a certain rigidity. The polymeric transparent casing protects the parts of the device that are not covered by the electromagnetic shield, for instance a lens or a light source. Those two parts are assembled in order to form the housing of the device. A need exists for reducing the production cost of such device and to simplify their assembling.

SUMMARY OF THE INVENTION

Therefore one object of the invention is to provide a image capture apparatus with a reduced production cost and a simpler assembling.

According to an aspect of the invention, it is provided an image capture device comprising a housing enclosing an electronic circuit board having an image sensor attached to a first face thereof, the housing comprising a front portion facing the first face and a rear portion facing a second face opposite the first face, the front portion comprising a front electromagnetic shield having an aperture facing the image sensor and an infra-red transparent material overmoulded onto the electromagnetic shield and mechanically obstructing the aperture.

Thanks to the infrared transparent material being overmoulded on the front electromagnetic shield, the number of pieces of the front portion is reduced by one, which simplify the assembling and enable a reduction of the cost of the device.

According to an embodiment, the image capture device comprises an optical lens configured to focus light rays directed through the aperture towards the image sensor, the optical lens being attached to the electronic circuit board.

According to an embodiment, the optical lens is fixed to a frame which is glued to the electronic circuit board.

According to an embodiment, the first face comprises at least an infrared light source facing a second aperture in the front electromagnetic shield, and/or the front electromagnetic shield comprises an opaque portion extending between the infrared light source and the lens and configured to prevent light emitted by the infrared light source to go directly into the lens.

According to an embodiment, the rear portion comprises a rear electromagnetic shield and a polymer material overmoulded over the rear electromagnetic shield.

According to an embodiment, the polymer material comprises polybutylene terephthalate.

According to an embodiment, the front electromagnetic shield is thermally coupled with the electronic circuit board and comprises metal, for instance aluminum, copper or stainless steel.

According to an embodiment, the rear electromagnetic shield is thermally coupled with the electronic circuit board and comprises metal, for instance aluminum, copper or stainless steel.

According to an embodiment, the housing has a protection index of at least IPX1 with respect to the IEC 60529 standard, and preferably at least IP52.

According to an embodiment, the infrared transparent material comprises polycarbonate.

DETAILED DESCRIPTION OF EXAMPLE(S)

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

Figure 2:
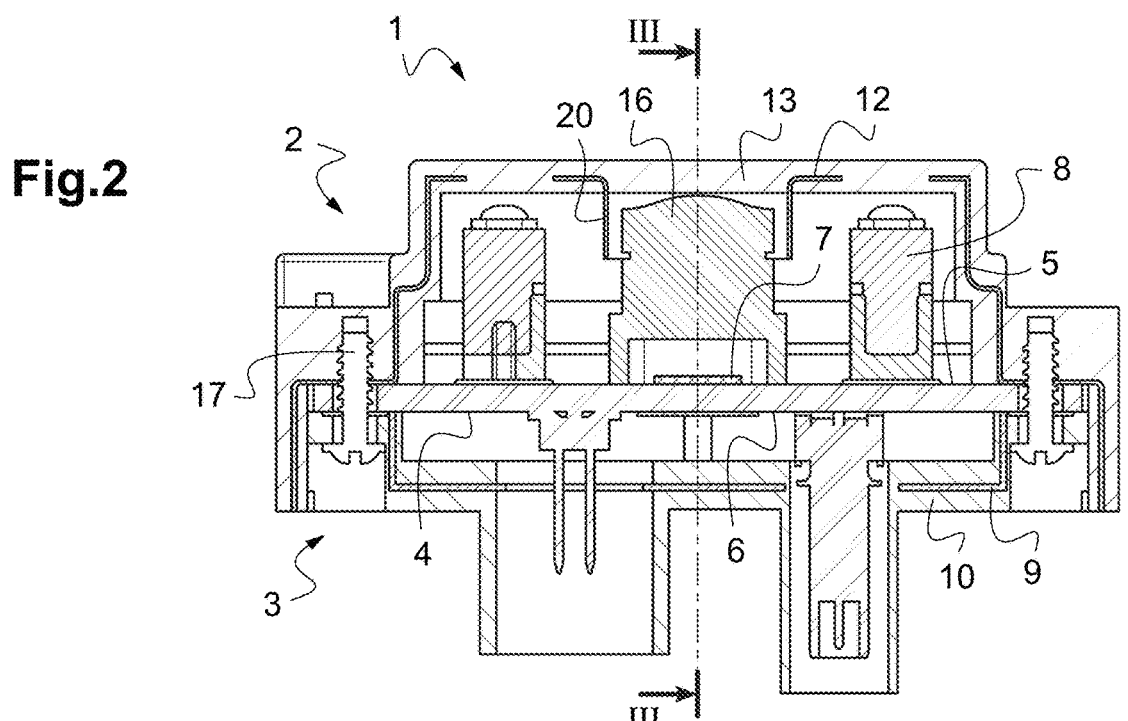
Figure 3:
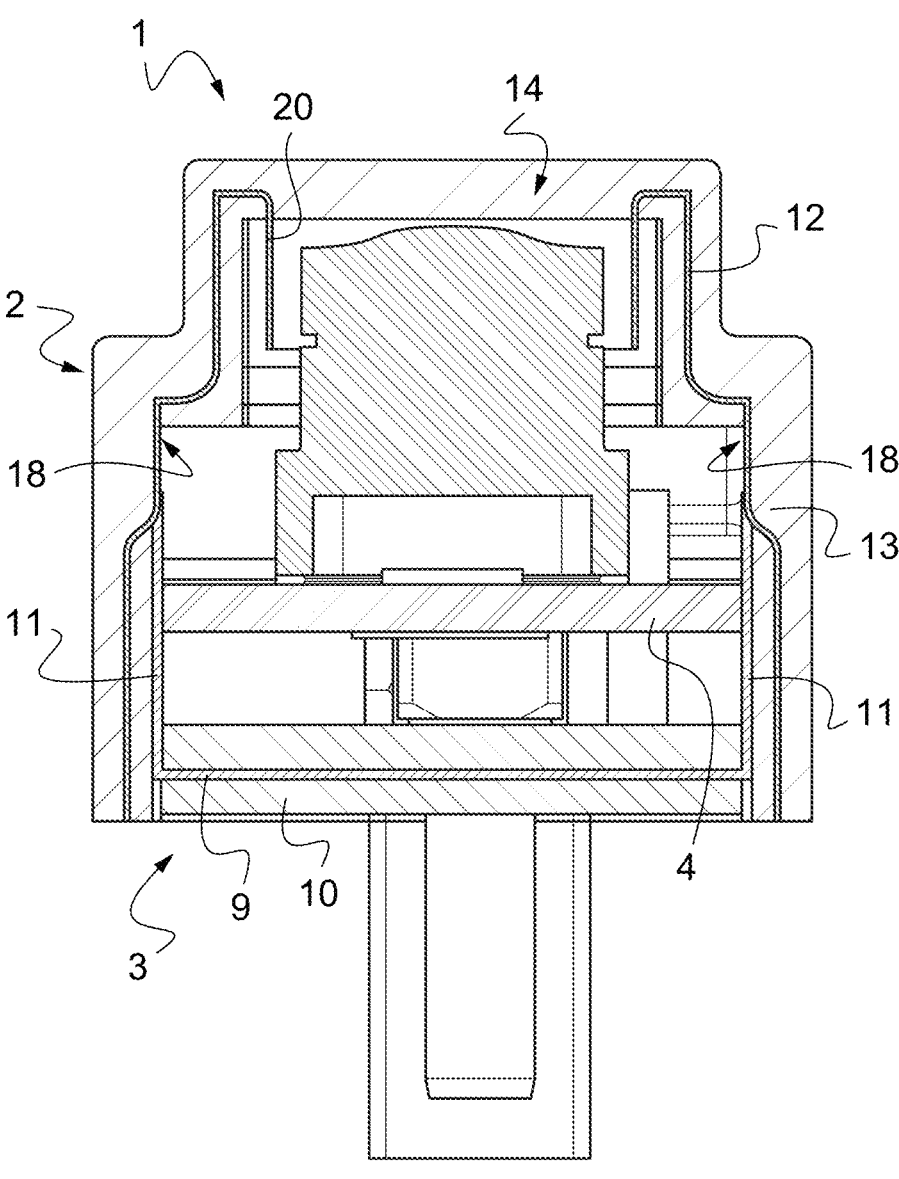

In the accompanying drawings:

FIG. 1 is an exploded view of an image apparatus device according to the invention, FIG. 2 is a cross sectional view of the device of FIG. 1, FIG. 3 is a cross sectional view of the device of FIG. 1, along the section line III-III of FIG. 2.

An image capture device according to an embodiment of the invention, as depicted in FIGS. 1 to 3 and designated as a whole by the reference 1, comprises a two-portion housing 2, 3 enclosing an electronic circuit board 4.

Here, the electronic circuit board 4 comprises a first face 5 and a second face 6 opposite to the first face 5. An image sensor 7, for instance a matrix of pixels, and at least a light source, here two light sources 8, are fixed on the first face 5. A lens 19 mounted on a frame fixed to the first face 5, for instance glued to the first face 5—is located in front of the image sensor.

The two-portion housing comprise a front portion 2 configured to face the first face 5 of the electronic circuit board 4 and a rear portion 3 configured to face the second face 6 of the electronic circuit board 4. The first portion 2 and the second portion 3 are configured to be assembled in order to form the housing enclosing the electronic circuit board 4, as apparent on FIG. 2.

The rear portion 3 comprises a rear electromagnetic shield 9 overmoulded with a polymer material, here polybutylene terephthalate. The rear electromagnetic shield 9 comprises several protrusions 11 extending from the periphery of the electromagnetic shield (here four protrusions, only one of which having a numeral referenced in the figures for clarity purpose), orthogonally to the first face 5 and second face 6 and configured to be directed toward the front portion 2. Here, the protrusion 11 are rectilinear strip and the dimensions of the rear portion 2 are such that, when the second face 6 is placed against the rear portion 2, the protrusions 11 prevent the movements of the electronic circuit board 4 in any direction parallel to the first faces 5 or to the second face 6.

The front portion 3 comprises a front electromagnetic shield 12 overmoulded with an infrared transparent material 13, for instance here a material that is transparent for infrared light and opaque for visible light. The front electromagnetic shield 12 is made in an opaque material and comprises a main aperture 14 configured to let light through to the image sensor 7. Two secondary apertures 15 are configured to let the light emitted by the light sources exit the housing. The infrared transparent material 13 encloses the electromagnetic shield so it covers the front electromagnetic shield surface (except for some bare areas described hereafter) and so it mechanically obstructs the apertures 14 and 15. Thus, the components of the electronic circuit board are protected and the light is not obstructed.

The assembly of the front portion 2, the rear portion 3 and the electronic circuit board 4 is ensured by fixation means, here two screws 17 configured each to be inserted in a plurality of coaxial holes made in the front portion 2, in the rear portion 3 and in the electronic circuit board 4.

In order to ensure a more reliable electromagnetic isolation, the front electromagnetic shield 12 and the rear electromagnetic shield 9 are at least electrically coupled (with or without direct contact), and preferably directly connected (with a direct contact).

As apparent on FIG. 3, the inner wall of the front portion 2 comprises several bare areas 18 where the front electromagnetic field 12 is devoid of infrared transparent material. These bare areas 18 are located such that, when the front portion 2 and the rear portion 3 are assembled, the protrusions 11 are in direct contact with the bare areas 18.

Here, the screws are conductive and in contact with the front electromagnetic shield 12, the rear electromagnetic shield 9, and the electronic circuit board 4, thus they ensure an electrical coupling between the front electromagnetic shield 12 and the rear electromagnetic shield 9.

In this embodiment, the front electromagnetic shield 12 comprises opaque portion 20 extending between the lens 19 and the light sources 8 and configured to prevent light emitted by the light sources 8 to go directly into the lens 19. For instance, the opaque portion 20 form a tunnel extending toward the first face, around the lens 19 and the frame 16, an extremity of which defining the outlines of the main aperture 14.

The different elements of the above-described device are not limited by the material they are made of, as long as the material is suitable with their function. For instance, the electromagnetic shields 9 and/or 12 may comprise any electrically conductive material. Preferably, they comprise a material that gives it a rigidity sufficient to absorbs moderate shocks. Preferably, the electromagnetic shields 9 and/or 12 comprise a material having a thermal conductivity sufficient to act as a heat sink. For instance, the electromagnetic shield 9, 12 comprise a metal, for instance aluminum, copper, or stainless steel.

The infrared transparent material 13 is preferably a plastic material and preferably polycarbonate. The polymer material 10 is preferably polybutylene terephthalate.

Here, the image capture device is an infrared image capture device. Therefore, the image sensor 7 is sensitive to infrared light and the light sources 8 are configured to emit infrared light. In application other than driver monitoring, the image capture device may be configured to capture light having other wavelengths, for instance wavelengths in the visible spectrum.

The housing 2,3 described above is configured to protect the electronic circuit board 4 against water. It has a protection index of at least IP52 with respect to the IEC 60529 standard or, in other words, it provides an effective protection against dripping water. In order to comply with higher protection indexes, seals may be added between the two electromagnetic shields 9, 12 and/or between the electromagnetic shields and the electronic circuit board 4.

The invention is not limited to the embodiment described above in connection with FIGS. 1 to 3.

For instance, the image capture device is not limited by the presence of light sources, nor it is by the number of the light sources. Other embodiments of the invention comprise no light source or only one light source.

The invention is not limited to fixation means being screws, but is compatible with any fixation means, for instance a clipping system, glue, rivets, etc.

It has been described an opaque portion 20 extending around the lens in order to prevent light emitted by the light sources to reach directly the lens. The shape and location of this opaque portion is not limitative. For instance, the invention is compatible with opaque portions placed around the light sources, or around both the light sources and the lens. In such cases, the opaque portions placed around the light source act as reflectors.

The invention claimed is:

1. An image capture device, comprising:
a housing enclosing an electronic circuit board comprising an image sensor attached to a first face thereof,
the housing comprising a front portion facing the first face and a rear portion facing a second face opposite the first face,
the front portion comprising a front electromagnetic shield comprising an aperture facing the image sensor and an infrared transparent material overmoulded onto the front electromagnetic shield and mechanically obstructing the aperture,
wherein the first face comprises at least an infrared light source facing a second aperture in the front electromagnetic shield,
the front electromagnetic shield comprising an opaque portion configured to prevent light emitted by the infrared light source to go directly into the image sensor.

2. The image capture device according to claim 1, further comprising:
an optical lens configured to focus light rays directed through the aperture towards the image sensor,
wherein the optical lens is attached to the electronic circuit board.

3. The image capture device according to claim 2, wherein the optical lens is fixed to a frame which is glued to the electronic circuit board.

4. The image capture device according to claim 2, wherein
the opaque portion of the front electromagnetic shield extends between the infrared light source and the lens and is configured to prevent light emitted by the infrared light source to go directly into the lens.

5. The image capture device according to claim 1, wherein the rear portion comprises a rear electromagnetic shield and a polymer material overmoulded over the rear electromagnetic shield.

6. The image capture device according to claim 5, wherein the polymer material comprises polybutylene terephthalate.

7. The image capture device according to claim 5, wherein the front electromagnetic shield is thermally coupled with the electronic circuit board and comprises metal.

8. The image capture device according to claim 1, wherein the rear electromagnetic shield is thermally coupled with the electronic circuit board and comprises metal.

9. The image capture device according to claim 1, wherein the housing has a protection index of at least IP52 with respect to the IEC 60529 standard.

10. The image capture device according to claim 1, wherein the infrared transparent material comprises polycarbonate.

\* \* \* \* \*